Dec. 29, 1970     W. J. ZISA ET AL     3,551,810
THREE-WIRE INDUCTION METER WITH MINIMIZED UNBALANCE ERRORS
Filed Aug. 28, 1968     2 Sheets-Sheet 1
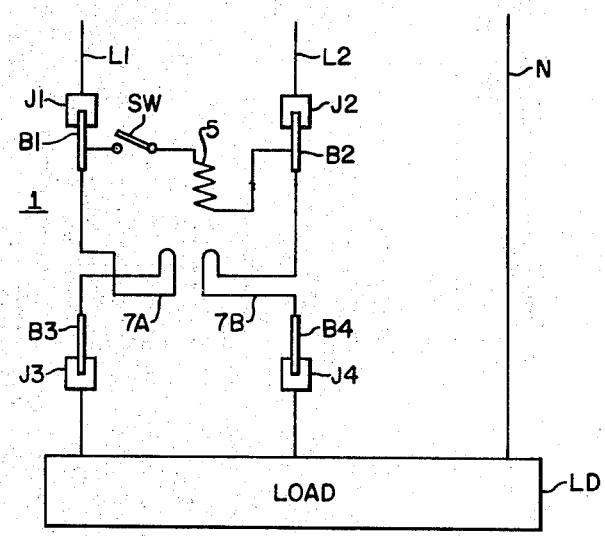
FIG. I.
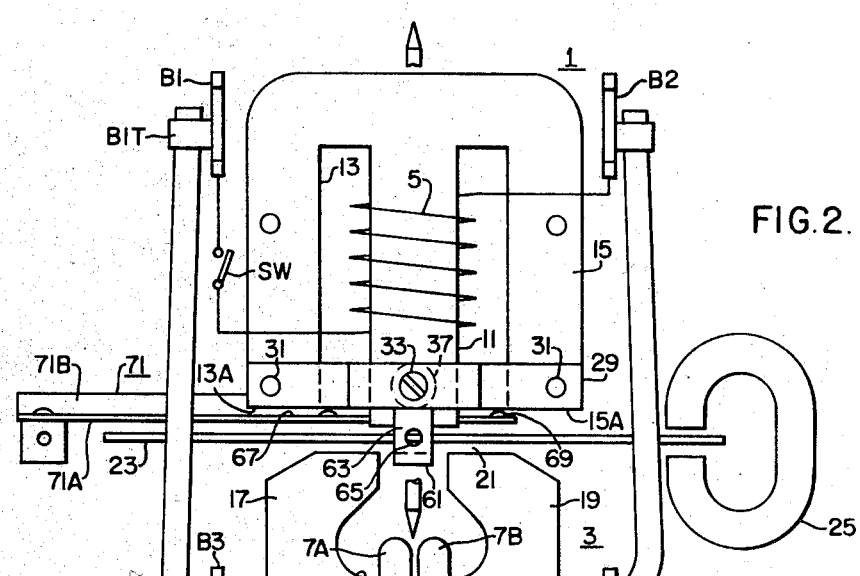
FIG. 2.
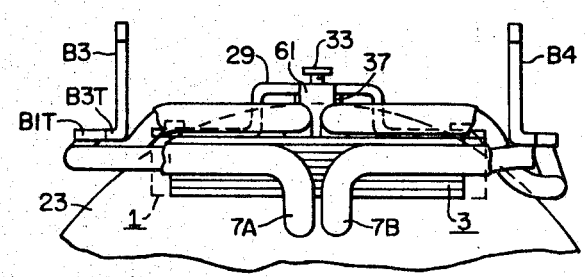
FIG. 3.
WITNESSES
Theodore F. Wrobel
James F. Young
INVENTORS
William J. Zisa and
James E. Ramsey, Jr.
BY C. L. Freedman
ATTORNEY

# United States Patent Office 3,551,810
Patented Dec. 29, 1970

3,551,810
THREE-WIRE INDUCTION METER WITH MINIMIZED UNBALANCE ERRORS
William J. Zisa, Cary, and James E. Ramsey, Jr., Raleigh, N.C., assignors to Westinghouse Electric Corporation, Pittsburgh, Pa., a corporation of Pennsylvania
Filed Aug. 28, 1968, Ser. No. 755,911
Int. Cl. G01r 11/02
U.S. Cl. 324—137                                   4 Claims

ABSTRACT OF THE DISCLOSURE

A three-wire induction meter has its current windings and the leads for the current windings located to minimize errors due to unbalance in the energizations of the current windings.

CROSS REFERENCES

U.S. patent applications of James E. Ramsey, Jr., Ser. No. 648,905 filed June 26, 1967, and of James E. Ramsey, Jr. and William J. Zisa, Ser. No. 716,875 filed Mar. 28, 1968, both assigned with the present application to the same assignee are directed to subject matter disclosed in the present patent application.

BACKGROUND OF THE INVENTION

This invention relates to electroresponsive induction devices and it has particular relation to three-wire induction measuring devices which are responsive to a function of the product of two variable quantities.

Aspects of the invention are applicable to induction devices, particularly those which are responsive to a function of volt amperes. Such induction devices may be employed for indicating or integrating functions of volt amperes such as vars or watts which are dependent on the product of voltage and current present in an alternating electrical circuit. The invention is particularly suitable for three-wire induction-type watthour meters and will be described with reference to such meters.

Three-wire watthour meters are shown and discussed in "Electrical Metermen's Handbook," 7th edition, published in 1965 by the Edison Electric Institute, New York, N.Y. Examples of such meters are disclosed in U.S. Pats. 2,930,980 and 2,947,942.

As stated on page 113 of the aforesaid handbook some utilities employ a standard three-wire 240-volt single-stator meter on two-wire 120-volt service. Consequently the meter must maintain acceptable accuracy over a wide range of voltages. Moreover the meter must maintain adequate accuracy over a wide range of unbalance of the energizations of its current windings. The importance of accuracy for the three-wire meter under unbalanced current conditions is recognized in the "AEIC-EEI-NEMA Standards for Watthour Meters" EEI Publication No. MSJ-10-1966. This is a product of three groups, one of which is the Edison Electric Institute, New York, N.Y. Test No. 7 appearing on page 7 of this publication provides that the change produced in the performance of a three-wire meter by using only one current circuit as compared with that when both current circuits are used shall not exceed plus or minus 1% under the test conditions.

SUMMARY OF THE INVENTION

In accordance with the invention the current circuits of a three-wire watthour meter each comprises a substantially closed current winding of heavy electrical conductive material. Preferably the two windings comprise turns which are centrally disposed on a magnetic part or core. Each of the turns is energized through two leads which extend parallel to each other away from the associated two turns. The leads are preferably as clear as possible of the magnetic core or part.

It is therefore an object of the invention to provide an improved three-wire induction device which remains accurate over a large range of current unbalance.

BRIEF DESCRIPTION OF THE DRAWINGS

Other objects of the invention will be apparent from the following description taken in conjunction with the accompanying drawings in which:

FIG. 1 is a schematic view of an electric system employing a three-wire watthour meter;
FIG. 2 is a view in rear elevation with parts broken away of the watthour meter shown in FIG. 1;
FIG. 3 is a view in bottom plan with parts broken away of the meter shown in FIG. 2.

DESCRIPTION OF THE PREFERRED EMBODIMENTS

Figure 4A:
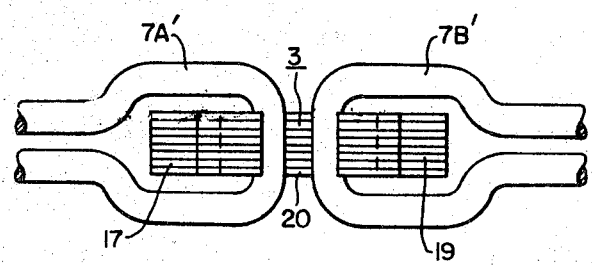
FIG. 4A is a view in top plan showing a modified association of current windings with a magnetic core or part of a meter.

Referring to the drawings FIG. 1 shows a three-wire service represented by two line or outer conductors L1 and L2 and a neutral conductor N. This service may operate at any desired voltage and frequency but for present purposes it will be assumed that the service is designed for operation at a power frequency such as 60 hertz and that the voltage between the line or outer conductors L1 and L2 is 240 volts.

A load LD is energized from the three-wire service through a three-wire induction watthour meter 1. It will be assumed that the watthour meter has contact blades B1 to B4 for detachable reception in contact jaws J1 to J4 associated with the line and load conductors in a conventional manner as shown in FIG. 1.

The watthour meter 1 includes a voltage coil 5 which is connected through a switch or disconnect link SW between the blades B1 and B2 for energization at 240 volts. A first current winding 7A is connected between the blades B1 and B3 for energization in accordance with current traversing the line conductor L1. A second current winding 7B is connected between the blades B2 and B4 for energization in accordance with current traversing the line conductor L2.

The watthour meter 1 includes a stator or electromagnet assembly which comprises a voltage magnetic section 2, a current magnetic section 3, and the voltage winding or coil 5. The magnetic sections are constructed of laminations of soft magnetic material such as silicon iron. The voltage section 2 is E-shaped and has a voltage pole 11 and two outer legs 13 and 15. The voltage coil 5 surrounds the voltage pole 11.

The current magnetic section has two current poles 17 and 19 which are spaced from the voltage pole 11 to define an air gap 21. The current poles 17 and 19 are formed as legs on a C- or U-shaped lamination the legs being connected by a web 20. The current windings 7A and 7B surround a portion of the U-shaped laminations. The voltage coil 5 has a large number of turns of copper or similar conductor of small diameter whereas the current windings 7A and 7B may be constructed of a single turn each of large-diameter conductor (e.g. 0.229 inch diameter copper conductor). It will be noted that the voltage pole 11, legs 13 and 15 and the current poles 17 and 19 all lie substantially in a common plane.

An electro-conductive armature in the form of a disc 23 has a portion positioned in the air gap 21 and is mounted for rotation about the axis of the disc. A portion of the disc also is located in the air gap of a permanent magnet 25 for damping purposes. The construction of the watthour meter as thus far specifically set forth is well known in the art.

When the voltage coil 5 and the current windings 7A and 7B are properly energized from the conductors L1 and L2, a shifting magnetic field is produced in the air gap 21 which develops a torque acting between the disc 23 and the electromagnet for the purpose of producing rotation of the disc 23 about its axis. Rotation of the disc 23 may be employed in any suitable manner for indicating energy supplied over the conductors N, L1 and L2 as by operating a conventional register (not shown).

Inductive-load or power-factor adjustment is discussed in the aforesaid "handbook," pages 99–101. In the present case, in order to adjust the phase relationship between the working voltage magnetic flux and the voltage supplied to the voltage winding a leakage path is established for voltage flux produced by the winding 5. This leakage path is linked by an electro-conductive material in the manner set forth in Pat. 3,212,005 filed Oct. 12, 1965.

As shown in FIGS. 2 and 3 the leakage path takes the form of a bracket 29 constructed of a soft magnetic material such as cold rolled steel. This bracket has its ends secured respectively to the outer legs 13 and 15 in any suitable manner as by rivets 31. It will be noted that this bracket extends across the free end of the voltage pole 11 and is spaced from such pole.

At a central point the bracket has a threaded opening for receiving a machine screw 33 constructed of a soft magnetic material such as soft magnetic steel. The tip of this screw may extend into an opening provided in the voltage pole 11.

The bracket 29 and the screw 33 establish a path for leakage magnetic flux derived from the voltage coil 5 which extends form the voltage pole 11 to the screw 33. From the screw 33 the path continues through two parallel branches formed by two halves of the bracket 29 to the outer legs 13 and 15. The amount of leakage magnetic flux passing through this magnetic path may be adjusted by rotating the screw 33 to alter its axial position relative to the voltage pole 11.

The magnetic path formed by the screw 33 and the bracket 29 is employed for adjustably loading the voltage coil 5. To this end an electro-conductive member is positioned to be linked by magnetic flux passing through the magnetic path. In the embodiment of FIG. 2 the eletroconductive member takes the form of a tube 37 which may be constructed of copper and which is concentric with the screw 33.

In effect the tube 37 constitutes a closed secondary winding for a transformer in which the primary winding is represented by the voltage coil 5. Losses due to current flowing in the tube 37 are reflected back to the voltage coil 5. The loading is adjusted by manipulation of the screw 33 and is employed for adjusting the angle by which magnetic flux derived from the voltage coil 5 lags the voltage applied to the coil. By this expedient the working voltage magnetic flux applied by the voltage coil 5 to the air gap 21 and the armature 23 may be brought into quadrature with the current magnetic flux applied by the current winding 7 to the air gap when the watthour meter is operating to measure a unity-power-factor load.

With the efficient voltage magnetic section illustrated and with a slightly thicker voltage magnetic disc 23 than that previously employed the voltage magnetic flux in the air gap is overlagged (more than 90° lagging) relative to the current magnetic flux when the adjuster screw 33 is withdrawn or screwed away from the voltage pole. To obtain such a flux relationship prior are meters have been forced to employ a separate lagging plate or loop. As representative of suitable parameters, the disc 23 may be constructed of aluminum sheet having a thickness of 0.040 inch. This symmetric adjustment contributes to a minimum of unbalance error.

Class II temperature compensation for the watthour meter may be provided as set forth in the aforesaid Pat. 3,212,005.

In order to improve the efficiency of the watthour meter a soft magnetic tongue 61 is located intermediate the pole faces of the current poles 17, 19 with its upper face in substantially the same plane as such pole faces. This tongue is connected through a soft magnetic element 63 to the mid part of the bracket 29. The tongue 61, the element 63 and the bracket 29 are integrally constructed from a sheet of soft magnetic material.

The tongue 61 is spaced from the pole face of the voltage pole 11 to define an air gap in which the armature 23 is located. Working voltage magnetic flux enters this air gap from the voltage pole and then passes through the tongue 61, the element 63, the bracket 29, and the two legs 13 and 15 in parallel back to the voltage pole 11.

The structure thus for specifically described provides good performance. However, the accuracy has been found to fall off when the voltage coil 5 is energized by a reduced voltage. For example, the voltage coil 5 may be designed for energization by a voltage within the range of 240 volts or less. Assuming that the accuracy is 100% when the voltage coil is energized by the full voltage or 240 volts, it has been found that when the voltage coil is energized by half voltage or 120 volts the meter runs slightly slow and the accuracy drops to 99% or 98% at 50% lagging power factor. Although such accuracy is adequate for a number of applications of the watthour meter an improvement in such accuracy is desirable.

The path followed by the working voltage magnetic flux is designed to saturate within the range of rated voltage for which the watthour meter is designed. Conveniently the element 63 may be given a cross section such that it is saturated when the voltage coil is energized by 240 volts. However, when the voltage coil is energized by 120 volts the cross section is not saturated. This construction may be proportioned to provide a substantially uniform accuracy of the watthour meter over the voltage range from 240 volts to less than 120 volts.

In FIG. 1 the desired cross section of the element 63 is provided by a hole 65 which extends through the element to decrease its cross section. Such a hole provides the desired reduction in cross section while assuring adequate rigidity of the parts.

In order to provide light-load calibration of the meter recourse is had to the auxiliary voltage pole faces 13A and 15A which the legs 13 and 15 present across the air gap 21 from the current poles. Magnetic voltage fluxes passing through these pole faces enter the armature 21 and produce auxiliary torques acting on the armature in opposite directions and effective under light-load conditions. Thus, as long as these torques are balanced they apply no resultant torque to the armature.

Light-load calibration of the meter is effected by controlling the balance between the auxiliary torques. To this end soft magnetic arms 67 and 69 are biased respectively against the pole faces 13A and 15A respectively. If the arms are positioned to balance the auxiliary torques the magnetic fluxes supplied through these pole faces have no resultant effect on the torque applied to the armature. If the arm 67 is moved inward in FIG. 2 and the arm 69 is moved outward from the balance or neutral positions, an unbalance results which applies a resultant torque acting on the armature in a first direction. If the movements of the arms are in the reverse directions the unbalance applies a resultant torque acting on the armature in a second direction opposite to the first direction.

Although the arms could be positioned independently of each other preferably they are both connected to a lever or member 71 which is pivotally mounted in the manner described in our patent application, Ser. No. 716,875, filed Mar. 28, 1968.

As previously noted the windings 7A and 7B each have one turn of rigid self-supporting electro-conductive material. For a class 200 meter the windings may be constructed of copper rod having a diameter of 0.229 inch. The windows and the portions of the leads for the windings which are located adjacent the magnetic section 3 are covered in any suitable manner by insulation. Thus the insulation may take the form of an insulating sleeve which is slipped over the copper rod forming the winding together with its leads. In a preferred embodiment of the invention the insulation takes the form of a thin epoxy coating 7C which is applied to the desired part by the bed-fluidizing method.

In order to minimize further the effect on accuracy of an unbalance in the current flowing through the windings 7A and 7B the locations of the windings and of their associated leads are carefully selected. Certain principles governing such locations will be understood more clearly from a consideration of FIGS. 4A to 5B. These principles may be summarized as follows:

(1) The convolutions around the magnetic section should be as close as possible to each other.

(2) Each turn should be as complete as possible.

(3) The leads running away from each of the windings should be as parallel and as close together as possible.

(4) The ends of the leads should be swung away from the magnetic section as much as possible.

(5) The coiled assemblies should be as similar as possible.

Figure 4B:
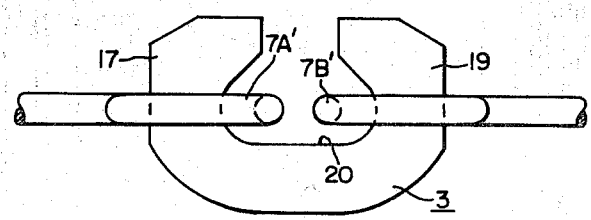
FIG. 4B is a view in side elevation of the structure of FIG. 4A.

In FIGS. 4A and 4B the turns or windings 7A and 7B are replaced by two windings 7A' and 7B' surrounding respectively the poles or legs 17 and 19 of the magnetic section 3. Tests have confirmed that the widely separated windings 7A' and 7B' of FIGS. 4A and 4B are undesirable if unbalanced currents are to be applied to the two windings. A meter employing the windings of FIGS. 4A and 4B has a large unbalanced error.

Figure 5A:
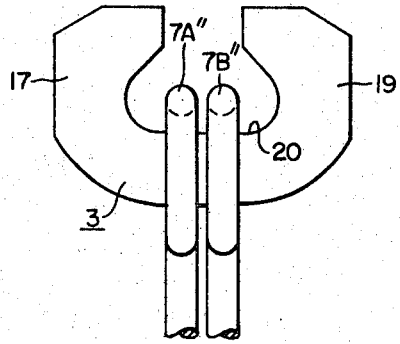
FIG. 5A is a view in front elevation of a modified association of current windings with a magnetic core or part.
Figure 5B:
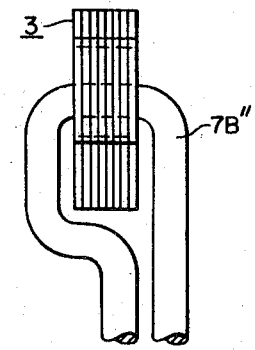
FIG. 5B is a view in side elevation of the structure shown in FIG. 5A.

In FIGS. 5A and 5B the current windings of FIG. 2 are replaced by current windings 7A'' and 7B'' in a configuration which yields minimum unbalance error. It will be noted that the convolutions of the windings 7A'' and 7B'' are as close as possible to each other. Each turn is complete as possible around the iron of the magnetic section 3. As shown in the figures, each turn extends around three sides of the iron of the associated magnetic section or 270° and also extends substantially around the fourth side of the iron. The ends of each turn are shown to be closer than the smallest dimension of the surrounded cross-section of iron. The leads from each winding are parallel to each other and are close to each other. The leads are directed away from the iron of the magnetic section 3 as much as possible. The windings are similar and are symmetrically arranged with respect to the magnetic section 3.

Because of the presence of other parts and because of the desire for a compact construction some departure from the arrangement of FIGS. 5A and 5B is desirable. The structures of FIGS. 2 and 3 represent a desirable compromise which is based on the principles discussed with reference to FIGS. 5A and 5B.

The windings 7A and 7B in FIGS. 2 and 3 are as close to each other as possible. It will be noted that they are on the opposite sides of a plane which contains the axis of the disc 23 and which is perpendicular to the plane of FIG. 2. Thus the windings are substantially symmetric with respect to the magnetic section 3.

Each of the windings 7A and 7B is a turn which is as complete as possible around the iron of the magnetic section 3.

The leads running away from the ends of each of the windings are substantially parallel and as close together as possible. It will be noted that one of the leads for the windings 7A extends directly to the contact blade B3 and is brazed or otherwise secured to a tab B3T bent from an end of such contact blade. The second lead for this winding extends substantially parallel to the first lead for a substantial distance and then passes around the end of the contact blades B3 to a tab B1T bent from the contact blade B1. The free end of the second lead is brazed or otherwise secured to the tab of the contact blade B1.

In an analogous manner the lower lead of the winding 7B in FIG. 2 extends directly to the contact blade B4 and is secured to the contact blade in any suitable manner as by brazing. The second lead for this winding runs substantially parallel and close to the first lead and then passes beneath the contact blade B4 as viewed in FIG. 2 to the contact blade B2. The free end of the second lead is brazed or otherwise secured to the contact blade B2.

The leads of the windings 7A and 7B are spaced substantially from the pole or legs 17 and 19. Thus if the line XX in FIG. 2 represents a plane which is transverse to the axis of the disc 23 the legs or poles 17 and 19 are on one side of the plane whereas the leads in the vicinity of the magnetic section 3 are on the opposite side of the plane. At the same time the windings together with their leads are substantially similar to each other.

Unbalance tests were conducted on current winding configurations for class 200 watthour meters at 1.0 and 0.50 lagging power factors based on:

(A) FIGS. 4A and 4B
(B) FIGS. 5A and 5B
(C) FIGS. 2 and 3
(D) Incomplete turn arrangement essentially like that of first patent noted above.

The reference performance in these tests was based on 100 amperes through each of the current windings of a pair at room temperature. The following unbalances were noted when 200 amperes were passed through only one current winding of a pair:

| Configuration: | 1.0 power factor error noted, percent | 0.50 power factor error noted, percent |
| --- | --- | --- |
| A | 1.4 | 5.1 |
| B | 0.0 | 0.2 |
| C | 0.5 | 1.6 |
| D | 2.0 | 5.5 |

We claim:

1. In an electroresponsive induction device having a voltage coil, a magnetic structure having a first part cooperating with the coil when the coil is energized by alternating voltage for directing voltage magnetic flux into an air gap, first and second current windings, said structure including a U-shaped magnetic part cooperating with the windings when the windings are energized by alternating current for directing current magnetic flux into the air gap to establish with the voltage magnetic flux a shifting magnetic field, and an electroconductive armature mounted for rotation relative to the structures in response to the magnetic field, the improvement which comprises a configuration for the windings wherein each of the windings has a single turn which links with and substantially surrounds a portion of the U-shaped magnetic structure, the ends of each of said turns being in close proximity to each other to provide a substantially complete turn, said U-shaped magnetic part having a pair of legs connected by a web at one end, the free ends of the legs providing pole faces bordering said air gap, said windings being adjacent each other on said web and being substantially symmetric relative to the U-shaped magnetic part, each of said leads extending substantially directly away from a plane located transverse to said web between said windings the ends of one of said windings being adjacent the ends of the other of said windings, said leads in the vicinity of the U-shaped magnetic part on one hand and said legs on the other hand being on opposite sides of a plane transverse to the plane of said U-shaped magnetic part, said windings being of rigid, self-supporting electroconductive material, said device being an induction watthour meter, the substantially complete turns of the current windings and the extension of the leads cooperating to provide an unbalance of the meter due to energization of only one of the windings which is less than 1% at 1.0 power factor and less than 2% at 50% lagging power factor at an ambient temperature of 25° C.

2. An arrangement as claimed in claim 1 in combination with a soft magnetic element connected in series with said air gap to carry said voltage magnetic flux, said soft magnetic element having a cross-section which saturates within the rated energization of said voltage coil.

3. A device as claimed in claim 1 wherein said first part of the magnetic structure comprises an E-shaped magnetic section having a voltage pole through which said voltage magnetic flux enters and leaves the air gap and a pair of auxiliary poles, and adjustable symmetric auxiliary magnetic means for directing voltage magnetic flux between said voltage pole and the auxiliary poles through paths spaced from the air gap to adjustably control the lagging of the voltage magnetic flux relative to the current magnetic flux, said armature comprising a disc having a thickness such that with the adjustment of the auxiliary magnetic path selected for maximum lagging the lagging introduced by the E-shaped magnetic section, the auxiliary magnetic means and the armature overlags the meter.

4. In an induction watthour meter, a voltage coil, a magnetic structure having a first part cooperating with the coil when the coil is energized by alternating voltage for directing voltage magnetic flux into an air gap, first and second current windings, said structure including a U-shaped magnetic part cooperating with the windings when the windings are energized by alternating current for directing current magnetic flux into the air gap to establish with the voltage magnetic flux a shifting magnetic field, and an electroconductive armature mounted for rotation relative to the structures in response to the magnetic field, said first part of the magnetic structure comprising an E-shaped magnetic section having a voltage pole through which said voltage magnetic flux enters and leaves the air gap and a pair of auxiliary poles, and adjustable symmetric auxiliary magnetic means for directing voltage magnetic flux between said voltage pole and the auxiliary poles through paths spaced from the air gap to adjustably control the lagging of the voltage magnetic flux relative to the current magnetic flux, said armature comprising a disc having a thickness such that with the adjustment of the auxiliary magnetic path selected for maximum lagging the lagging introduced by the E-shaped magnetic section, the auxiliary magnetic means and the armature overlags the meter.

References Cited
UNITED STATES PATENTS

| | | | |
|---|---|---|---|
| 2,278,995 | 4/1942 | Kinnard | 324—137X |
| 2,930,980 | 3/1960 | Scammand | 324—137 |

ALFRED E. SMITH, Primary Examiner

U.S. Cl. X.R.

324—138